(12) United States Patent
Gross

(10) Patent No.: US 9,888,289 B2
(45) Date of Patent: Feb. 6, 2018

(54) LIQUID OVERLAY FOR VIDEO CONTENT

(71) Applicant: Karoline Gross, London (GB)

(72) Inventor: Karoline Gross, London (GB)

(73) Assignee: SMARTZER LTD, London (GB)

(*) Notice: Subject to any disclaimer, the term of this patent is extended or adjusted under 35 U.S.C. 154(b) by 0 days.

(21) Appl. No.: 14/432,124

(22) PCT Filed: Sep. 19, 2013

(86) PCT No.: PCT/GB2013/000386
§ 371 (c)(1),
(2) Date: Mar. 27, 2015

(87) PCT Pub. No.: WO2014/049311
PCT Pub. Date: Apr. 3, 2014

(65) Prior Publication Data
US 2015/0289022 A1     Oct. 8, 2015

Related U.S. Application Data

(60) Provisional application No. 61/707,894, filed on Sep. 29, 2012.

(51) Int. Cl.
*H04N 21/4722* (2011.01)
*H04N 21/4725* (2011.01)
(Continued)

(52) U.S. Cl.
CPC ... *H04N 21/4722* (2013.01); *H04N 21/26283* (2013.01); *H04N 21/26291* (2013.01);
(Continued)

(58) Field of Classification Search
CPC ............ H04N 21/4722; H04N 21/472; H04N 21/4725; H04N 21/8583; H04N 21/8586;
(Continued)

(56) References Cited

U.S. PATENT DOCUMENTS

2002/0078456 A1*  6/2002  Hudson ............ G06F 17/30017
                                                      725/60
2003/0131357 A1   7/2003  Kim
                     (Continued)

FOREIGN PATENT DOCUMENTS

EP          1971145       9/2008
WO       2010/141939    12/2010

*Primary Examiner* — Nathan Flynn
*Assistant Examiner* — Cynthia Fogg
(74) *Attorney, Agent, or Firm* — Van Court & Aldridge LLP

(57) ABSTRACT

Disclosed herein is a method for playing an interactive video on a user device. The method comprises receiving an interactive content file associated with a video to be played by the user device, the interactive content file comprising: one or more interactive tags arranged to be overlaid on the video when the video is played by the user device, wherein the one or more interactive tags have associated information which is accessible by a user when a respective tag is selected via a user interface of the user device; and information defining a location and a time for the tag to be overlaid on the video. The method also comprises receiving the video and combining, at a processor, the video and the one or more interactive tags in accordance with the information defining the location and the time for the tag to be overlaid on the video to produce an interactive video for display, and playing the interactive video for display. A method for creating an interactive content file associated with a video is also disclosed. Corresponding systems and computer program products are also disclosed.

27 Claims, 7 Drawing Sheets

(51) Int. Cl.
*H04N 21/858* (2011.01)
*H04N 21/262* (2011.01)
*H04N 21/472* (2011.01)
*H04N 21/482* (2011.01)
*H04N 21/81* (2011.01)

(52) U.S. Cl.
CPC ....... *H04N 21/472* (2013.01); *H04N 21/4725* (2013.01); *H04N 21/482* (2013.01); *H04N 21/812* (2013.01); *H04N 21/8583* (2013.01); *H04N 21/8586* (2013.01)

(58) Field of Classification Search
CPC ............. H04N 21/235; H04N 21/2542; H04N 21/4307; H04N 21/435; H04N 21/4622; H04N 21/47815; H04N 21/6125; H04N 5/445; H04N 21/26283; H04N 21/26291; H04N 21/812; H04N 5/8583; G06F 3/04842; G06F 3/04817
USPC .......................................................... 725/51
See application file for complete search history.

(56) References Cited

U.S. PATENT DOCUMENTS

| | | | |
|---|---|---|---|
| 2007/0260677 A1* | 11/2007 | DeMarco | H04N 21/4825 709/203 |
| 2008/0298697 A1* | 12/2008 | Lee | G06F 3/04817 382/243 |
| 2009/0016696 A1 | 1/2009 | Hsieh et al. | |
| 2009/0092374 A1* | 4/2009 | Kulas | H04N 7/173 386/248 |
| 2009/0094520 A1 | 4/2009 | Kulas | |
| 2010/0095326 A1* | 4/2010 | Robertson, III | G11B 27/28 725/40 |
| 2010/0154007 A1* | 6/2010 | Touboul | G06Q 30/02 725/60 |
| 2011/0262103 A1* | 10/2011 | Ramachandran | H04N 5/44591 386/240 |
| 2012/0167145 A1* | 6/2012 | Incorvia | H04N 21/4725 725/60 |
| 2012/0185901 A1* | 7/2012 | Macrae | H04N 5/4403 725/51 |
| 2012/0206647 A1* | 8/2012 | Allsbrook | H04N 21/434 348/461 |

* cited by examiner

LIQUID OVERLAY FOR VIDEO CONTENT

CROSS-REFERENCE TO RELATED APPLICATIONS

This application is a 371 National Phase entry of International Patent Application No. PCT/GB2013/000386 filed Sep. 19, 2013, which claims the benefit of priority of U.S. Provisional Patent Application No. 61/707,894 filed Sep. 29, 2012. Each of these earlier applications is incorporated herein by reference.

Methods and corresponding systems for creating and playing an interactive video file are disclosed. More specifically, but not exclusively, the system disclosed herein allows for consumers to access product information and purchasing options for items featured in video content such as commercials, television shows, films, music videos and other online videos using an interactive functionality of the video.

Product placement in video content is common practice in advertising. The items of interest can be of any type such as products (e.g., clothing, household items, industrial items, digital media), services (personal, professional, travel, etc.), or anything else that advertiser or company may wish to sell or promote to a consumer.

Systems have recently been developed that enable to consumers to access additional information about products that they like when they see a product in a video. Known methods include QR codes, which can be scanned by a smart phone or such like, and presenting a URL address in an advert that the user can then insert into their search engine and find out more information about the product. However, in known systems there is inefficiency in the process of identifying additional information associated with products in videos.

Some embodiments of the invention are arranged to at least partially mitigate the aforementioned problem.

According to a first aspect of the invention, a method for playing an interactive video on a user device is provided. The method comprises receiving an interactive content file associated with a video to be played by the user device, the interactive content file comprising: one or more interactive tags arranged to be overlaid on the video when the video is played by the user device, wherein the one or more interactive tags have associated information which is accessible by a user when a respective tag is selected via a user interface of the user device; and information defining a location and a time for the tag to be overlaid on the video. The method also comprises receiving the video and combining, at a processor, the video and the one or more interactive tags in accordance with the information defining the location and the time for the tag to be overlaid on the video to produce an interactive video for display, and playing the interactive video for display.

The method may further comprise receiving, from the user interface of the user device, selection of a tag of the one or more tags by a user, wherein the step of combining further comprises combining the associated information with the video.

When a user selects a tag for displaying associated information the method may further comprise determining the associated information to be displayed from the tags arranged to be displayed at a time period associated with the time of the selection by the user. The time period may be a range of time associated with the time of the selection by the user. The tags may be stored in time order.

The step of combining the video and the one or more interactive tags may only takes place once the user makes a selection via the user interface of the user device. The steps of combining and playing may take place in real-time.

The information defining a location and a time for the tag to be overlaid on the video may comprise a start-time corresponding to a time when the tag is arranged to start being played and an end-time corresponding to a time when the tag is arranged to stop being played.

The location for the tag may change between the start-time and the end-time. The associated information may be part of the interactive content file.

When a plurality of the tags have the same associated information, the associated information may only be stored once in the interactive content file and each tag includes a link to the relevant associated information. The associated information may include a hyperlink to further associated information.

The interactive content file may include a link to the video. The method may further comprise fetching the video in accordance with the link to the video after receiving the interactive content file and before receiving the video.

According to a second aspect of the invention a method for creating an interactive content file associated with a video is provided. The method comprises providing one or more interactive tags arranged to be overlaid on the video when the video is played by a user device, wherein the one or more interactive tags have associated information which is accessible by a user when a respective tag is selected via a user interface of the user device, defining a location and a time for the tag to be overlaid on the video, and encapsulating the one or more tags and information corresponding to the defined location and the defined time for the tag to be overlaid on the video as the interactive content file.

The tags may be arranged in time order. The step of defining a time for the tag to be overlaid on the video may comprise defining a start-time corresponding to a time when the tag is arranged to start being played and defining an end-time corresponding to a time when the tag is arranged to stop being played.

The step of defining the location may comprise defining more than one location for the tag between the start-time and the end-time. The step of encapsulating may further comprise encapsulating the associated information in the interactive content file. When a plurality of the tags have the same associated information, the associated information may only be stored once in the interactive content file and each tag includes a link to the relevant associated information. The associated information may include a hyperlink to further associated information.

The method may further comprise providing a user with an editing screen comprising a video frame in which the video is played and a timeline frame, wherein the user is able to define the location of the tag in the video frame and the time that the tag is played in the timeline frame.

The interactive content file may be an XML file. The interactive content file may include a link to the video. The interactive video file may thereby be arranged so that once the interactive content file is received by the user device the video can be fetched in accordance with the link to the video.

According to another aspect of the invention a system arranged to perform any of the methods disclosed herein is provided.

According to yet another aspect of the invention a computer readable medium comprising computer readable code operable, in use, to instruct a computer system to perform any of the methods disclosed herein is provided.

According to a further aspect of the invention an interactive content file associated with a video is provided, the interactive content file comprising one or more interactive tags arranged to be overlaid on the video when the video is played by a user device, wherein the one or more interactive tags have associated information which is accessible by a user when a respective tag is selected via a user interface of the user device, and information defining a location and a time for the tag to be overlaid on the video.

The tags may be arranged in time order. The information defining a time for the tag to be overlaid on the video may comprise a start-time corresponding to a time when the tag is arranged to start being played and an end-time corresponding to a time when the tag is arranged to stop being played. The information defining the location may comprise information defining more than one location for the tag between the start-time and the end-time. The associated information may be part of the interactive content file.

When a plurality of the tags have the same associated information, the associated information may only be stored once in the interactive content file and each tag includes a link to the relevant associated information. The associated information may include a hyperlink to further associated information.

The interactive content file may include a link to the video. The interactive video file may thereby be arranged so that once the interactive content file is received by the user device the video can be fetched in accordance with the link to the video. The interactive content file may be an XML file.

To overcome the problem of the prior art, advertisers and product owners may be allowed to insert interactive icons into their video content through an icon adding system where icons are placed on objects featured in the video corresponding to the video time-code and item location on the screen. Video viewers can purchase and access additional information directly from the video screen. Additional actions may be introduced to the video in order to improve user experience and enable interactive advertising.

The icon information may be saved into an overlay presented on top of the video file. Upon playing a video edited by the icon adding system, available icons may be presented to the consumer alongside further information and purchasing options for the product. All products featured in a video may be additionally presented in a draw alongside the video.

The icons added through the icon adding system may remain in one location throughout the time the product is presented on screen.

The icons added through the icon adding system may change location on the screen, following the product changing location in the video.

The icons may be presented upon interaction with the screen by a user, being hidden otherwise.

The icons may be presented automatically as time-code associated with an icon is detected.

Also disclosed herein is a system for creating and presenting a liquid overlay for video content, comprising; an icon adding system through which users create an overlay to their video content; and an interface including a video player and liquid overlay through which users interact with icons related to content within videos. Interactive icons are presentation automatically upon detection of interaction by a user. Icon information may be stored in a database.

Icons may be added to the overlay by defining the length of icons present by defining initial and final timestamps using the video timeline presented separately on a display screen underneath the video creating an icon area.

A method for creating the liquid overlay video content may further comprise using an initial marker selecting the initial location for the icon on the video screen and using a second marker to define the final location of the icon at the end of the appearance of the icon to make the icon follow a moving object on the screen. The path of the movement of the icon from initial to final location may be linear defined by a single location and non-linear defined by a plurality of locations.

Interactive icons may be displayed within the video screen area. Icons may be displayed on the screen upon detection of interaction by the user at a time-code which has associated icon information. Automatic pausing of the video upon interaction with an icon is possible. Additional information relating to the icon may be presented within the video screen, upon interaction with the icon. Icon information including item name, image, associated URL may be stored in a package in the database, separately from the video file. Icon information may be edited using the icon adding system with an instant updating effect on the video player with which the particular icon is associated. A plurality of icon information may be related to one particular video file stored separately in the server. The video player and associated liquid overlay file may be embedded on a third party website. All interactive icon information related to a particular video may be presented in a draw alongside the video.

A liquid overlay system is disclosed herein that is overlaid onto an online video player, on either a mobile device or a via the web, providing information and purchasing options for items, people, locations or the like, directly associated with the unique ID number of the playing video file and specific time code. The liquid overlay consists of a layer in which individual icons are floating and following specific items based on predefined locations in the icon adding system. Interacting with the icons displayed on a video screen, initiates a display of an additional information area, which may contain action buttons associated with a third party website, link to internal shopping cart, social media or similar.

An exemplary embodiment of the invention will now be described by way of example and with reference to the accompanying drawings in which.

Throughout the description and drawings like reference numerals refer to like parts.

Figure 1:
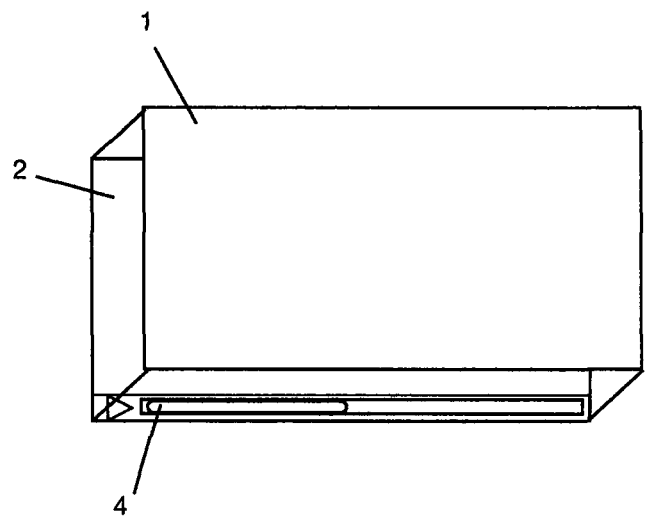
FIG. 1 shows the structure of an interactive video player.

In FIG. 1 a presentation structure of an interactive video system is shown. The presentation structure of the system comprises an overlay 1 on top of a video file 2, which scales proportionally to the size of the video file 2. The video file 2 may be HTML5, Flash, Quicktime, or similar. The overlay 1 and video file 2 are connected via the video player time-code 4, used to detect items in the overlay. The overlay 1 and video file 2 together comprise an interactive video, which is played on an interactive video player 3.

In practice, when the interactive video file is played, the video is played in real-time and icons or tags forming part of the overlay are overlaid on the video as the video plays. The overlaid icons are associated with objects in the video. Users watching the video are then able to select an icon and in response additional interactive content associated with the object in the video and selected icon is displayed.

Figure 2:
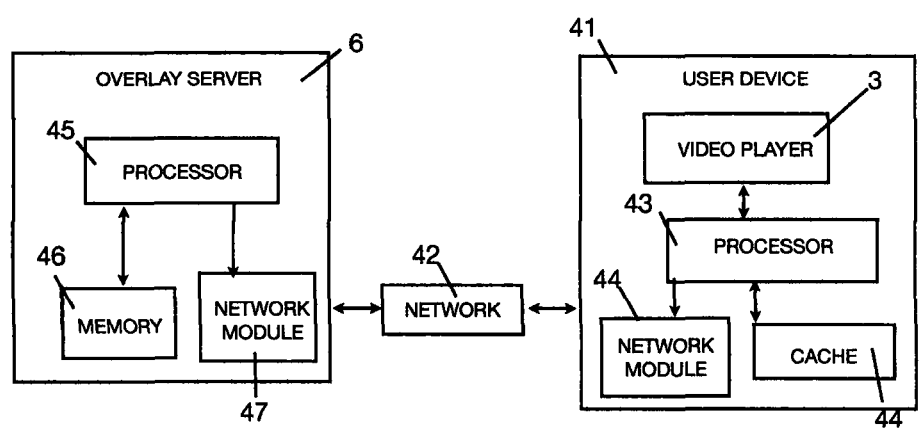
FIG. 2 shows the interactive video system including the user device, network and overlay server.

FIG. 2 shows the structure of the interactive video system, which comprises an overlay server 6 that contains a processor 45, a memory 46 for storing the video file 2 and associated overlay information 1 in the memory 46. The video file 2 and associated overlay information 1 are packaged as an XML file. For the associated overlay information 1, the package contains overlay data including a list of icons 32 to be overlaid on the video file 2 and therefore associated with the video file 2. These icons 32 are listed in time order of display. Any graphics associated with the overlay and information associated with the icons is also stored in the package.

If a URL based request is made from a user device and the website associated with the URL contains an interactive video player, the interactive video is transferred to the processor 45, and further to the network module 47 in the overlay server, through the network 42 to the user device 41. Sending all data associated with a particular video file at once enables for all data to be fetched instantly. Consequently, as the video is streamed contention is reduced because all data has already been transferred across the network and is stored locally on the user device on which the interactive video is being watched. In practice, once the interactive video is received by the network module 44 in the user device, the XML package is stored locally in the user device cache 44. Playback is enabled once the video file is loaded on the requested page and the XML file is fully downloaded onto the user device. Upon playback, information from the memory cache 44 is fetched and associated icons are processed in the user device processor 43 and presented in the overlay video player 3 in the user device 41. The processing of the interactive video means that when appropriate icon data is fetched from the locally stored XML file in user device cache 44, only the tags arranged to be viewed at that instant in time are searched when the processor is attempting to identify which tag to display. By limiting the searching functionality to the tags that are arranged to be displayed at that time the amount of processing that has to be carried out by the user device is significantly reduced.

Figure 3:
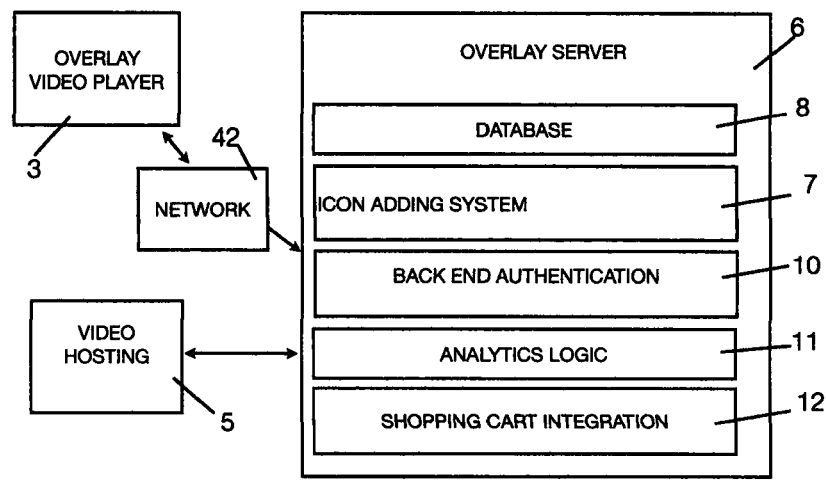
FIG. 3 shows the flow sheet describing relationships between the liquid overlay server, a video hosting service, a network and a video player.

FIG. 3 shows the overlay video player 3 which may be a native mobile application player or web based video player. The video hosting service 5 is linked to the interactive video player 3 via overlay server 6, in order to host videos, upload videos, and embed interactive video players 3 on third party websites and mobile applications.

Overlay server 6 includes a database 8 where icon information is stored in XML packages containing individual icon information arranged in timeline order, an icon adding system 7, a backend authentication unit 10 used to authenticate new metadata and icon upload and changes in existing icons, an analytics logic unit 11 sending specified events in order to track overlay player usage along with API, containing tracked user behavior data, including but not limited to, video playback events, social media activity, browsing events, calls to third party websites, shopping cart states and order history, and a shopping cart integration unit 12 allowing instant purchases from the interactive video player 3 which includes elements for handling a shopping cart, such as user authentication and credentials, shipping and billing preferences shopping cart and order management.

The overlay server 6 is connected to the overlay video player 3 in the user device 41 through a network 42 in order to transmit the video file and XML package with icon information upon playback request. During playback, once icon information is requested, it is fetched from the user device cache 44.

Figure 4:
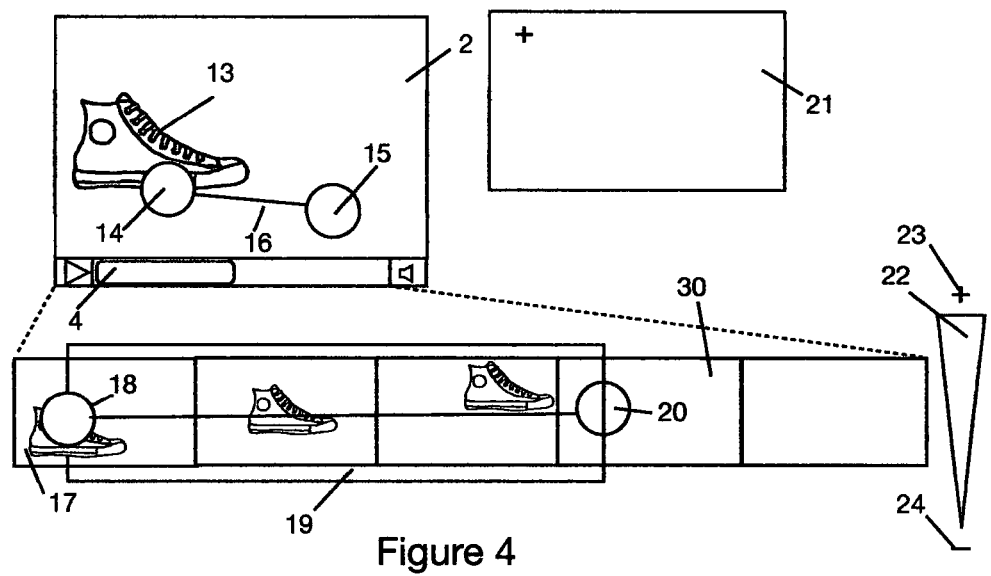
FIG. 4 shows an icon adding system interface used by a user to define where and when an interactive icon is placed on an item of a video.

FIG. 4 shows the icon adding method within the icon adding system 7. The icon adding system plays chosen video file 2. The video is also shown as a timeline 17 under the video player. The timeline 17 contains screenshots 30 from the video at specific time intervals. The time intervals can be modified using the zoom tool 22 by increasing the time interval between screenshots 23 or decreasing the time interval between screenshots 24.

Upon selecting a new icon from menu 21, the new icon 14 is placed on a default location on the video screen. The icon 14 can then be dragged to overlay the chosen product in the video. An extension to the icon 15 is used when the product on the screen moves to follow the product. The extension is placed to the final location where the item is at the end of the time period it is on screen. The icon moves along the connector 16 from first location 14 to second location 15.

The length of the icon remaining on the screen is determined by selecting the beginning 18 and end 20 time points. This creates the icon area 19.

Once all of the icon areas 19 for a video have been defined by the icon adding system 7, the overlay 1 file containing all icon information is uploaded to the overlay server 6 in order to transmit the information to be locally stored in user device 41 upon request. A combination of all icon areas associated with one video file is stored as a separate XML file in the database 8. There may be a plurality of identical icons within one video. In such circumstances, only one copy of each icon and associated information is included in the XML file, and that information is referenced multiple times. This thereby reduces the size of the XML file, which in turn reduces the bandwidth used to transmit the interactive video across a network, it reduces the memory used on the user device, and it reduces the latency between selecting an interactive video for playing and the step of playing the interactive video. The size of an icon 21 can technically be any size between one pixel and the maximum size of the video screen.

Figure 5:
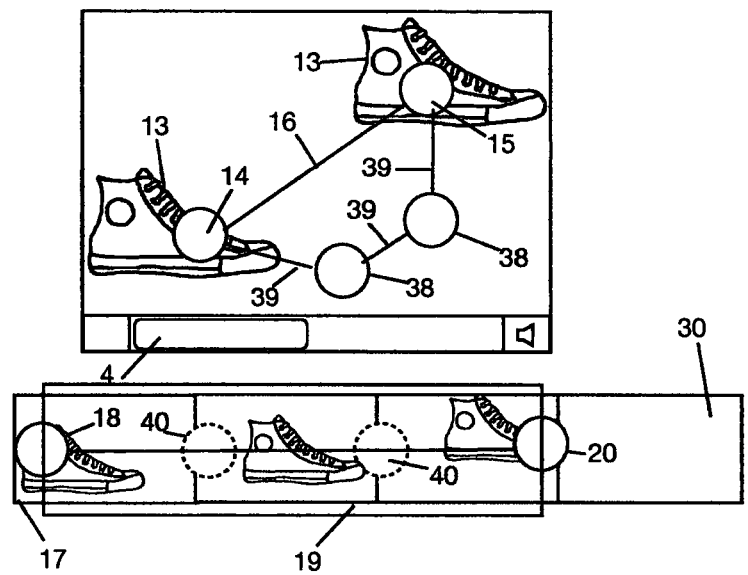
FIG. 5 shows the icon adding system where multiple paths for an icon are defined for a moving object.

FIG. 5 shows an alternative embodiment in which the new icon 14 and extension 15 are used to follow a moving object 13 within specified timeframe 19. The location of the new icon 14 corresponds to the initial location of the object at start-marker 18 timeline, which is the time the object first appears in the video. The location of the extension to the icon 15 corresponds to the final location of the object at end-marker 20, which the time the object last appears in the video continuously from start-marker 18. During playback the icon moves along the path 16 defined by the icon 14 and extended icon 15. The speed at which the icon moves correlates to the icon area 19 lengths. For example, doubling the length of an icon area would half the speed at which the icon moves.

In a further alternative embodiment multiple paths are defined for one icon, effectively resulting in a non-linear path of movement for the icon. As can be seen by the dotted line in FIG. 5, multiple locations can be defined using icon extensions 38. Paths 39 between the icons are automatically created once the icon extensions 38 are defined. The corresponding locations of the extensions 38 are indicated along the icon area 19 as marks 40. These marks can be moved in order to control the speed at which the icon moves between the extension points 38.

Figure 6:
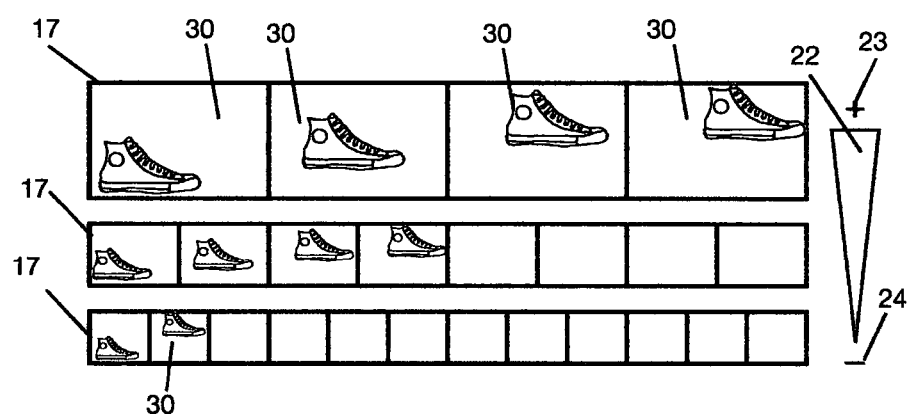
FIG. 6 shows how the icon adding system allows for precision in placing icons.

FIG. 6 shows an alternative embodiment in which the scale of the timeline view 17 of the video played in the overlay player 3 is modified in the overlay server. By default, screenshots 30 of the video are shown at chosen time intervals. The intervals may be varied allowing more precise icon area 19 defining using the zoom tool 22 to zoom in 23 or zoom out 24. The maximum zoom in interval between screenshots 30 is 1 second. In contrast, the minimum zoom in interval is such that the first image on the left of the timeline is the first frame of the video and the last image on the right of the timeline is the last frame in the video.

Figure 7:
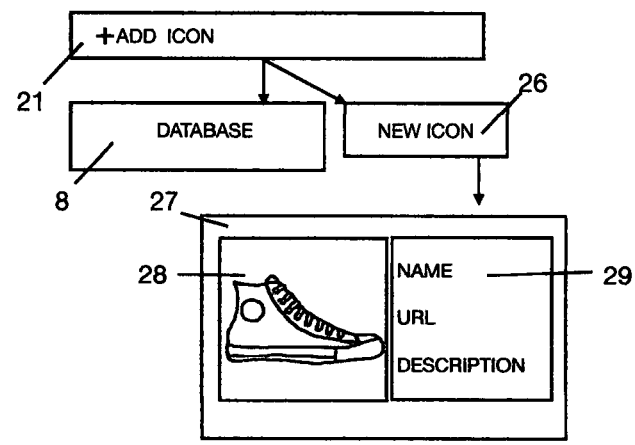
FIG. 7 shows a process of adding a new icon to the video.

FIG. 7 shows an additional embodiment in which new icon information is created in the overlay server. By adding a new icon 21 using the icon adding system 7 the icon information may be selected from previously saved database 8 within the overlay server 6, in which icon information is stored and organized. Alternatively, a new icon 26 is created. Upon creation of the new icon, specific content for the information area 34 can be defined. An image of the product 28 may be uploaded, or a URL link may be used to present an image, and an associated URL address 29 for the object may be added. New icon information is stored in the database 6 in the overlay server 6.

There may be a plurality of different icons 32 identified for a video, with corresponding actions 35 associated therewith. Some icons may provide additional information about a particular item or person in the video. Some icons may be associated with a product, which can be purchased from the video. A social media icon may provide a link to create a posting to a social media network or anything else related to the item of interest.

Figure 8:
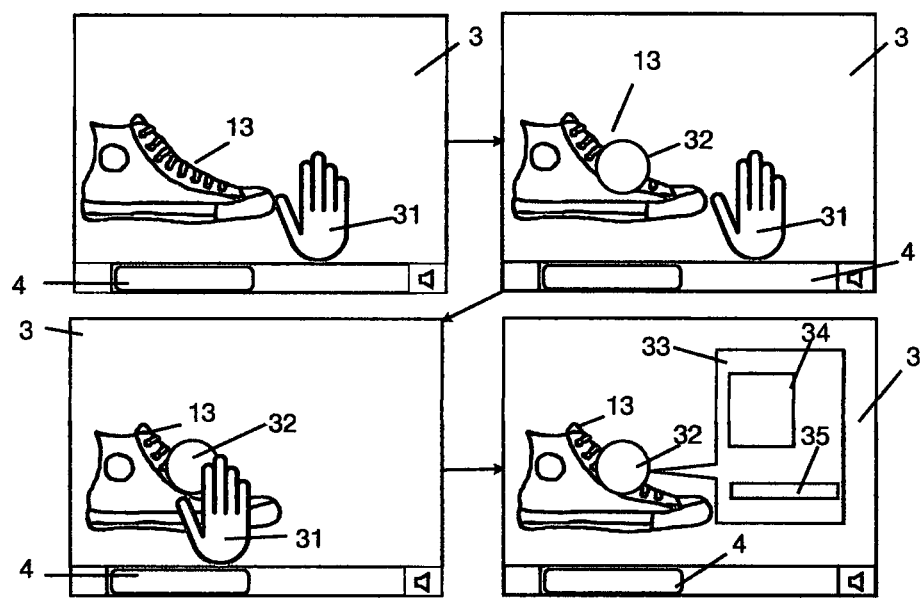
FIG. 8 shows a process by which the icons are presented on the video screen when displayed upon interaction.

FIG. 8 shows a flow of events when an interaction with the overlay video player is detected at the user device 41 during playback. In normal state, the interactive video player 3 plays video without presenting overlay component 1. Upon interaction with the video player, which may be through clicking or touching 31 the screen, the overlay enabled video player 3 presents the overlay and associated icons 32 with the time-code 4 and objects on screen 13. The information is fetched from the cache 44 through the processor 43 in the user device 41. Upon interaction with an icon 32 which may be through touching 31 a touchscreen display or clicking using a cursor controlled by a user interface, an additional information area 33 is presented in which there may be additional information and imagery 34 and actions 35 to interact with depending on the type of icon, which could be additional information, purchasing or third party website amongst others.

In an alternative embodiment, the video player pauses upon interaction with the liquid overlay player 3 and icons 32. Alternatively, the video may also carry on playing the video as icons 32 or additional information 33 as an overlay is displayed over the video.

Figure 9:
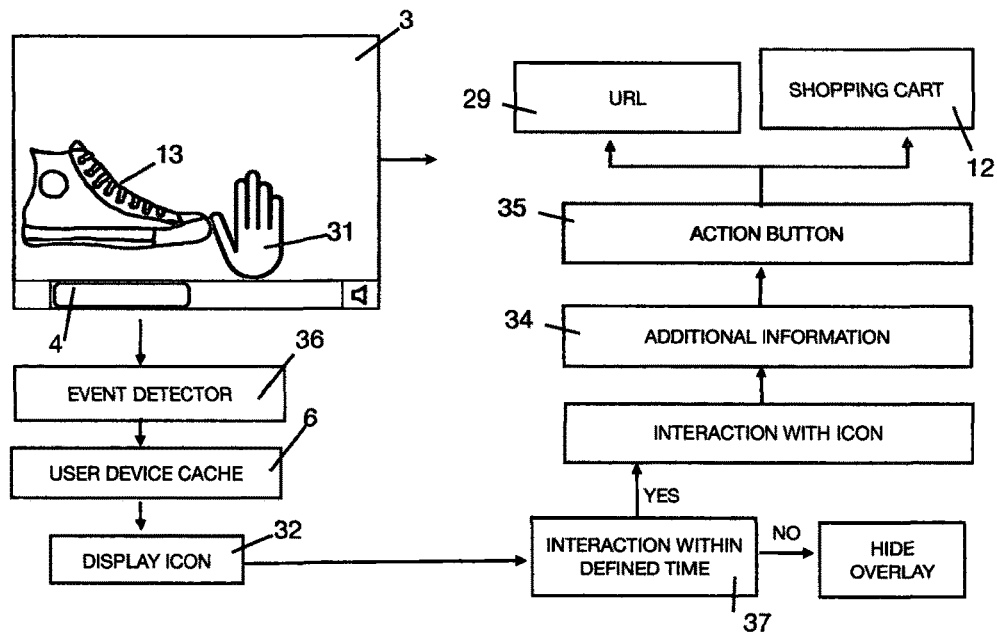
FIG. 9 shows a flow sheet of events upon interaction with interactive video screen.

FIG. 9 shows a flow sheet for interaction with the video player, such as touching a touchscreen display 31 by the user. Any interaction with the player is detected by an event detector 36, which detects icon information associated with the time-code 4 at the time of interaction. In order to find correct tags, a small selection of tags within a range of time-code at the time of interaction is searched, as opposed to searching through all icons associated with the video. For instance, upon interaction at 00:20 seconds, only tags within five seconds ranging from 00:15 to 00:25 are searched. This method reduces processing and allows fast fetching and presentation of correct tags. Associated metadata icons 32 and information 33 is fetched from the user device cache 6. Any detected icons 32 are presented on the interactive video player 3 for a specified time period, such as five seconds for instance. Interaction with an icon 32 within the defined time period 37, will lead to displaying additional information 34 depending on the type of icon. This information will be presented adjacent to the icon 32 with which interaction has been detected. Detection of interaction with additional button 35 within the information area 33, creates a predefined response depending on the type of action button 35 including, but not limited to redirection via a URL link 29 to an external website, or a button linking the item to internal shopping cart logic 12.

Figure 10:
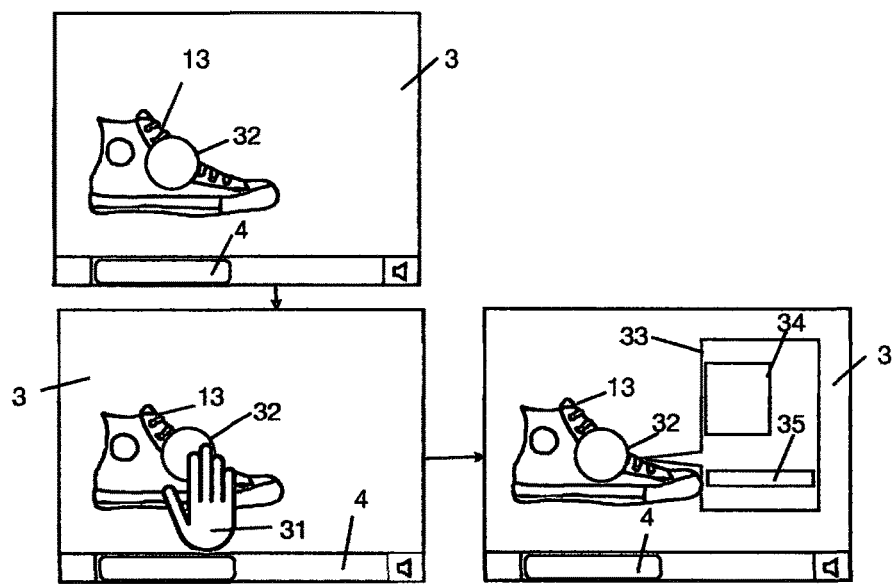
FIG. 10 shows the process by which the icons are presented on the video screen when displayed automatically.

FIG. 10 shows an alternative embodiment in which icons 32 within the interactive video player 3 in the user device 41 are presented automatically upon association with the video time-code 4. The icons 32 may be touched or clicked in order to present an additional information window 33.

Figure 11:
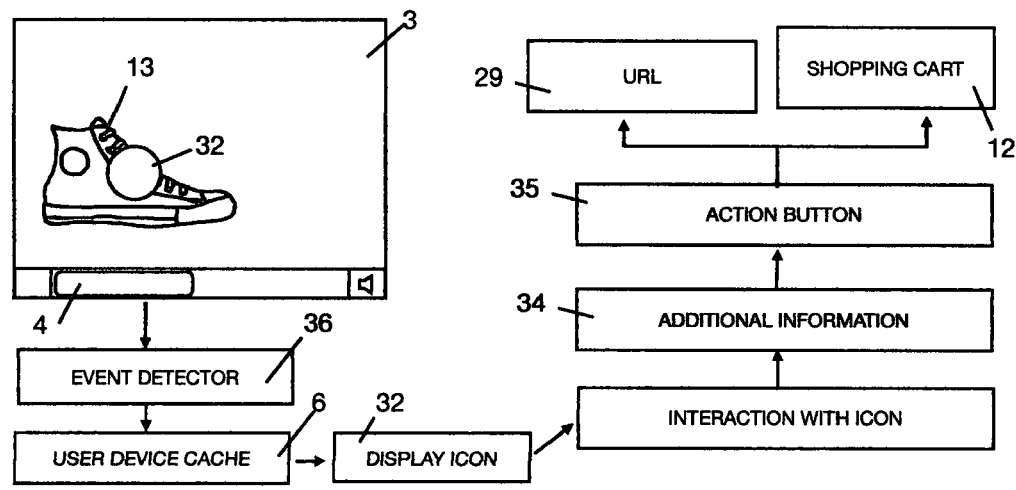
FIG. 11 shows a flow sheet of events for presenting an icon associated with a time-code upon detecting the icon.

FIG. 11 shows an alternative embodiment in which a flow sheet demonstrates the series of events upon detection of icon information associated with time-code as described in FIG. 8. The event detector 36 detects icon information associated with a time-code during playback. During playback a small selection of tags within a range of time-codes at the time of interaction is searched, as opposed to searching through all icons associated with the video. For instance, upon interaction at 00:20 seconds, only tags within five seconds ranging from 00:15 to 00:25 are searched. This method reduces processing and allows fast fetching and presentation of correct tags. Pre-loaded icon information in the XML file is fetched from user device cache 6 and the icon 32 is displayed on the liquid overlay player 3 at a predefined location. Icons are dynamically created and destroyed during playback. Upon interaction with the icon, which may be via touch or clicking, additional information 34 about the object 13 associated with the icon 32 is presented. This information is stored in the pre-loaded XML file in user device cache 6, allowing the information to be presented quickly even on low bandwidth devices where latency may be an issue. There may be an additional action button 35. Interaction with an additional action button shall create a predefined response depending on the type of action button 35 including, but not limited to redirection via a URL link 29 to an external website, or a button linking the item to internal shopping cart logic 12.

Figure 12:
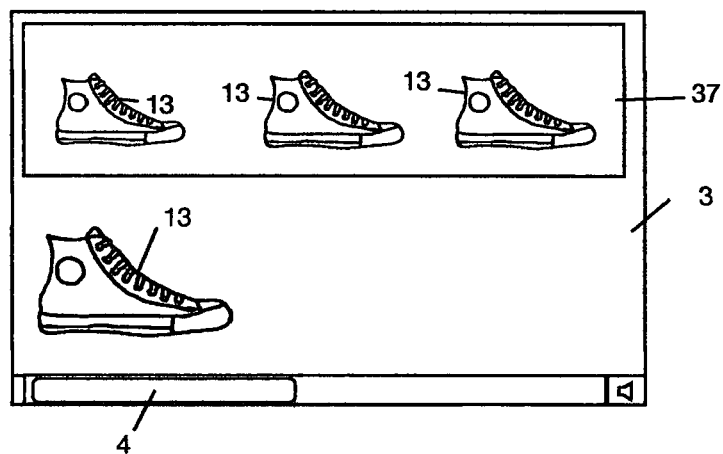
FIG. 12 shows a window of the display presenting all products featured in the video.

FIG. 12 shows an additional embodiment in which all objects 13 associated with an icon 32 are displayed within a particular interactive video player 3. The list of objects 13 is presented in a window 37 which can be positioned anywhere within the overlay screen. The window 37 may be opened or closed. The object information in the window is same as corresponding icon information in the overlay. Using the same file for both object information 33 in the window and information via an icon 33 by downloading the product only once provides various advantages such as reduced bandwidth when transmitting the interactive video, as previously discussed. For instance, a plurality of the same object may appear within a video, however the icon information is only downloaded once.

Figure 13:
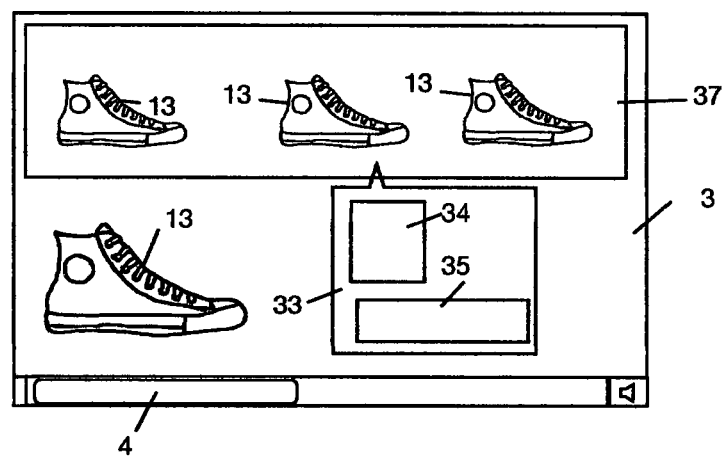
FIG. 13 shows information presented upon interaction with an item in the window of the display.

FIG. 13 shows a further embodiment in which upon interaction with an object 13 within the window 37, further information 33, which may include imagery and descriptive text 34 related to the object and an additional action button 35.

It will be appreciated that video refers to a plurality of images that are displayed in a consecutive order over a period of time. A video may include a slideshow wherein each frame of the video is displayed for many seconds.

It will be appreciated that in alternative arrangements the interactive content file and the video may be packaged together as an interactive video file. In other alternative arrangements the interactive content file and video may be transmitted across the network separately and received at the user device with markers identifying their associated with one another.

In alternative arrangements the video may be played on a user device and displayed on a screen separate from the user device.

Throughout this document it will be appreciated that the terms interactive video, liquid video, liquid overlay video and overlay video are interchangeable. The term "liquid" is used to refer to the overlaying of information on a video.

The various methods described above may be implemented by a computer program. The computer program may include computer code arranged to instruct a computer to perform the functions of one or more of the various methods described above. The computer program and/or the code for performing such methods may be provided to an apparatus, such as a computer, on a computer readable medium or computer program product. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network.

The invention claimed is:

1. A method for playing an interactive video on a user device, the method comprising:
   receiving an interactive content file associated with a video to be played by the user device, the interactive content file comprising:
      one or more interactive tags arranged to be overlaid on the video when the video is played by the user device, wherein the one or more interactive tags have associated information which is accessible by a user when a respective tag is selected via a user interface of the user device;
      information defining a location and a time for the tag to be overlaid on the video;
      the tags are associated with objects in the video; and
      a window that displays all the objects featured in the video that have tags associated with them, and interaction with one of these objects within the window causes an additional information area to be presented, wherein the information associated with interactive tags is the same as the additional information associated with the objects; and
   receiving the video;
   playing the received video without overlaying any of the one or more interactive tags over the playing video even though the playing video comprises at least one object associated with at least one of the interactive tags, wherein the at least one interactive tag comprises an icon that would be displayed if a user moves a user interface curser over the at least one object;
   in response to the user moving the user interface cursor over at least one object displayed in the playing video, combining, at a processor, the video and the one or more interactive tags in accordance with the information defining the location and the time for the icon to be overlaid on the video to produce an interactive video for display;
   playing the interactive video for display while the user has maintained the user interface cursor over the at least one object of the playing video such that the icon is not hidden from view and overlaid over the video to indicate to the user that additional information is available for further display upon selection of the object; and
   when the user ceases positioning the user interface cursor over the at least one object or the information specifies that the tag is no longer available for being overlaid over the playing video, ceasing the combining the video and the one or more interactive tags such that the received video is played without overlaying any of the one or more interactive tags.

2. The method according to claim 1, further comprising receiving, from the user interface of the user device, selection of a tag of the one or more tags by a user, wherein the step of combining further comprises combining the associated information with the video.

3. The method according to claim 2, wherein when the user selects a tag for displaying associated information the method further comprises determining the associated information to be displayed from the tags arranged to be displayed at a time period associated with the time of the selection by the user.

4. The method according to claim 3, wherein the time period is a range of time associated with the time of the selection by the user.

5. The method according to claim 3, wherein the tags are stored in time order.

6. The method according to claim 1, wherein the step of combining the video and the one or more interactive tags only takes place once the user makes a selection via the user interface of the user device.

7. The method according to claim 1, wherein the steps of combining and playing take place in real-time.

8. The method according to claim 1, wherein the information defining a location and a time for the tag to be overlaid on the video comprises a start-time corresponding to a time when the tag is arranged to start being played and an end-time corresponding to a time when the tag is arranged to stop being played.

9. The method according to claim 8, wherein the location for the tag changes between the start-time and the end-time.

10. The method according to claim 1, wherein the associated information is part of the interactive content file.

11. The method according to claim 10, wherein when a plurality of the tags have the same associated information, the associated information is only stored once in the interactive content file and each tag includes a link to the relevant associated information.

12. The method according to claim 1, wherein the interactive content file includes a link to the video, and the method further comprises fetching the video in accordance with the link to the video after receiving the interactive content file and before receiving the video.

13. A non-transitory computer readable medium comprising computer readable code operable, in use, to instruct a computer system to perform the method of claim 1.

14. A method for creating an interactive content file associated with a video, the method comprising:
  providing one or more interactive tags arranged to be overlaid on at least one object displayed within the video when the video is played by a user device and a user is interacting with one of the at least one object, wherein the one or more interactive tags have associated information which is accessible by the user when a respective tag is selected via a user interface of the user device, and wherein one or more interactive tags comprises an icon that remains hidden from view unless the user moves a user interface curser over the at least one object;
  defining a window that displays all the objects featured in the video that have tags associated with them, and interaction with one of these objects within the window causes an additional information area to be presented, wherein the information associated with interactive tags is the same as the additional information associated with the objects;
  defining a location and a time for the tag to be overlaid on the video, wherein the step of defining a time for the tag to be overlaid on the video comprises defining a start-time corresponding to a time when the tag is arranged to start being played and defining an end-time corresponding to a time when the tag is arranged to stop being played,
  wherein the step of defining a location comprises defining a first location for the tag to be overlaid on a first of the at least one object at the start-time and a second location for the tag to be overlaid over the first object at the end-time; and
  encapsulating the one or more tags and information corresponding to the defined location, the window, and the defined time for the tag to be overlaid on the video as the interactive content file.

15. The method according to claim 14, wherein the tags are arranged in time order.

16. The method according to claim 14, wherein the step of encapsulating further comprises encapsulating the associated information in the interactive content file.

17. The method according to claim 16, wherein when a plurality of the tags have the same associated information, the associated information is only stored once in the interactive content file and each tag includes a link to the relevant associated information.

18. The method according to claim 14, further comprising providing a user with an editing screen comprising a video frame in which the video is played and a timeline frame, wherein the user is able to define the location of the tag in the video frame and the time that the tag is played in the timeline frame.

19. The method according to claim 14, wherein the interactive content file includes a link to the video, the interactive video file thereby arranged so that once the interactive content file is received by the user device the video can be fetched in accordance with the link to the video.

20. A non-transitory computer readable medium comprising computer readable code operable, in use, to instruct a computer system to perform the method of claim 14.

21. A user device for processing an interactive content file associated with a video, the user device comprising:
  a user interface;
  a network module operative to receive the interactive content file and the video, wherein the interactive content file comprises:
    one or more interactive tags arranged to be overlaid on at least one object displayed within the video when the video is played by a user device and a user is interacting with one of the at least one object, wherein the one or more interactive tags have associated information which is accessible by the user when a respective tag is selected via a user interface of the user device, and wherein at least one of the interactive tags comprises an icon that remains hidden from view unless the user moves a user interface curser over the at least one object; and
    information defining a location and a time for the tag to be overlaid on the video, wherein the time comprises a start-time corresponding to a time when the tag is arranged to start being played and defining an end-time corresponding to a time when the tag is arranged to stop being played, and the location comprises a first location for the tag to be overlaid on a first of the at least one object at the start-time, at least one intervening location for the tag to be overlaid over the first object between the start and end times, and a second location for the tag to be overlaid over the first object at the end-time; and
    a window that displays all the objects featured in the video that have tags associated with them, and interaction with one of these objects within the window causes an additional information area to be presented, wherein the information associated with interactive tags is the same as the additional information associated with the objects; and
  a processor operative to:
    combine the received video and the interactive overlay to be overlaid on the video to produce an interactive video for display; and
    playing the interactive video for display.

22. The user device according to claim 21, wherein the tags are arranged in time order.

23. The user device according to claim 22, wherein the information defining a time for the tag to be overlaid on the video comprises a start-time corresponding to a time when the tag is arranged to start being played and an end-time corresponding to a time when the tag is arranged to stop being played.

24. The user device according to claim 23, wherein the information defining the location comprises information defining more than one location for the tag between the start-time and the end-time.

25. The user device according to claim 21, wherein the associated information is part of the interactive content file.

26. The user device according to claim 25, wherein when a plurality of the tags have the same associated information, the associated information is only stored once in the interactive content file and each tag includes a link to the relevant associated information.

27. The user device according to claim 21, wherein the interactive content file includes a link to the video, the interactive video file thereby arranged so that once the interactive content file is received by the user device the video can be fetched in accordance with the link to the video.

* * * * *